United States Patent [19]
Gafken et al.

[11] Patent Number: 6,157,970
[45] Date of Patent: Dec. 5, 2000

[54] DIRECT MEMORY ACCESS SYSTEM USING TIME-MULTIPLEXING FOR TRANSFERRING ADDRESS, DATA, AND CONTROL AND A SEPARATE CONTROL LINE FOR SERIALLY TRANSMITTING ENCODED DMA CHANNEL NUMBER

[75] Inventors: Andrew H. Gafken, Folsom; Joseph A. Bennett, Rancho Cordova; David I. Poisner, Folsom, all of Calif.

[73] Assignee: Intel Corporation, Santa Clara, Calif.

[21] Appl. No.: 08/936,318

[22] Filed: Sep. 24, 1997

[51] Int. Cl.[7] .............................. G06F 13/28; G06F 13/40
[52] U.S. Cl. ................................... 710/27; 710/23
[58] Field of Search ..................... 395/847, 842; 345/435; 709/212, 250; 710/22, 27, 240, 104, 113; 340/825.5; 700/18; 702/29

[56] References Cited

U.S. PATENT DOCUMENTS

| | | | |
|---|---|---|---|
| 3,633,166 | 1/1972 | Picard ............................... | 340/825.05 |
| 3,821,715 | 6/1974 | Hoff, Jr. et al. ..................... | 711/1 |
| 3,882,470 | 5/1975 | Hunter .............................. | 365/200 |
| 3,924,241 | 12/1975 | Kronies ............................ | 711/151 |
| 3,972,028 | 7/1976 | Weber et al. ...................... | 711/220 |
| 4,007,452 | 2/1977 | Hoff, Jr. ........................... | 365/63 |
| 4,099,231 | 7/1978 | Kotok et al. ...................... | 711/168 |
| 4,191,996 | 3/1980 | Chesley ............................ | 395/183.06 |
| 4,263,650 | 4/1981 | Bennett et al. .................... | 395/851 |
| 4,286,321 | 8/1981 | Baker et al. ...................... | 395/307 |
| 4,306,298 | 12/1981 | McElroy ........................... | 711/211 |
| 4,315,308 | 2/1982 | Jackson ............................ | 364/200 |
| 4,315,310 | 2/1982 | Bayliss et al. ..................... | 364/200 |
| 4,333,142 | 6/1982 | Chesley ............................ | 395/500 |
| 4,373,183 | 2/1983 | Means et al. ...................... | 395/304 |
| 4,375,665 | 3/1983 | Schmidt ............................ | 395/307 |
| 4,443,864 | 4/1984 | McElroy ........................... | 395/307 |
| 4,449,207 | 5/1984 | Kung et al. ....................... | 365/189.02 |
| 4,470,114 | 9/1984 | Gerhold ............................ | 395/291 |
| 4,480,307 | 10/1984 | Budde et al. ...................... | 395/280 |
| 4,481,625 | 11/1984 | Roberts et al. .................... | 370/464 |
| 4,488,218 | 12/1984 | Grimes .............................. | 395/296 |
| 4,513,370 | 4/1985 | Ziv et al. .......................... | 395/200.55 |
| 4,630,193 | 12/1986 | Kris .................................. | 395/557 |
| 4,660,141 | 4/1987 | Ceccon et al. .................... | 395/829 |
| 4,675,813 | 6/1987 | Locke ............................... | 395/829 |
| 4,766,536 | 8/1988 | Wilson, Jr. et al. ................ | 395/301 |
| 4,811,202 | 3/1989 | Schabowski ...................... | 395/307 |
| 4,920,486 | 4/1990 | Nielsen ............................. | 364/200 |
| 5,038,320 | 8/1991 | Heath et al. ...................... | 395/830 |
| 5,129,069 | 7/1992 | Helm et al. ....................... | 711/172 |
| 5,150,313 | 9/1992 | Van Den Engh et al. .......... | 702/79 |
| 5,159,679 | 10/1992 | Culley .............................. | 395/425 |
| 5,175,831 | 12/1992 | Kumar .............................. | 395/652 |
| 5,214,767 | 5/1993 | Wanner et al. ..................... | 710/22 |
| 5,317,723 | 5/1994 | Heap et al. ....................... | 395/500 |
| 5,367,639 | 11/1994 | Sodos ............................... | 395/275 |
| 5,392,033 | 2/1995 | Oman et al. ...................... | 340/825.5 |
| 5,434,997 | 7/1995 | Landry et al. ..................... | 395/575 |
| 5,448,701 | 9/1995 | Metz, Jr. et al. .................. | 710/113 |
| 5,471,674 | 11/1995 | Stewart et al. .................... | 395/650 |
| 5,475,854 | 12/1995 | Thomsen et al. .................. | 395/800 |
| 5,553,297 | 9/1996 | Yonezawa et al. ................ | 700/18 |
| 5,561,819 | 10/1996 | Gephardt et al. .................. | 710/27 |
| 5,561,821 | 10/1996 | Gephardt et al. .................. | 395/848 |
| 5,579,530 | 11/1996 | Solomon et al. .................. | 395/855 |
| 5,581,745 | 12/1996 | Muraoka et al. .................. | 395/557 |
| 5,596,756 | 1/1997 | O'Brien ............................ | 395/750 |

(List continued on next page.)

OTHER PUBLICATIONS

PCI Specification Revision 2.1, Jun. 1996.
International Search Report—International application No.: PCT/US98/13402, Nov. 19, 1998.

*Primary Examiner*—Thomas C. Lee
*Attorney, Agent, or Firm*—Blakely, Sokoloff, Taylor & Zafman LLP

[57] ABSTRACT

A system including a host coupled to a memory device and a peripheral controller device. The host is coupled to the peripheral controller device via a bus having a plurality of general purpose signal lines to carry time-multiplexed address, data, and control information. The peripheral controller device performs direct memory access (DMA) transactions with the memory device via the host and the bus.

25 Claims, 8 Drawing Sheets

U.S. PATENT DOCUMENTS

| | | | |
|---|---|---|---|
| 5,619,728 | 4/1997 | Jones et al. | 395/847 |
| 5,634,099 | 5/1997 | Andrews et al. | 709/212 |
| 5,664,197 | 9/1997 | Kardach et al. | 395/728 |
| 5,768,622 | 6/1998 | Lory et al. | 395/855 |
| 5,793,990 | 8/1998 | Jirgal et al. | 395/287 |
| 5,838,993 | 11/1998 | Riley et al. | 395/842 |
| 5,841,715 | 11/1998 | Farmwald et al. | 365/203 |
| 5,991,841 | 11/1999 | Gafken et al. | 710/104 |

DIRECT MEMORY ACCESS SYSTEM USING TIME-MULTIPLEXING FOR TRANSFERRING ADDRESS, DATA, AND CONTROL AND A SEPARATE CONTROL LINE FOR SERIALLY TRANSMITTING ENCODED DMA CHANNEL NUMBER

CROSS-REFERENCE TO RELATED APPLICATIONS

This application is related to U.S. patent application Ser. No. 08/936,303, filed Sep. 24, 1997, still pending, entitled I/O TRANSACTIONS ON A LOW PIN COUNT BUS, U.S. patent application Ser. No. 08/936,848, filed Sep. 24, 1997 now U.S. Pat. No. 5,991,841, entitled MEMORY TRANSACTIONS ON A LOW PIN COUNT BUS, and U.S. patent application Ser. No. 08/936,319, filed Sep. 24, 1997, still pending, entitled BUS MASTER TRANSACTIONS ON A LOW PIN COUNT BUS. Each of the above identified applications are assigned to the same assignee as the present application.

FIELD OF THE INVENTION

The present invention relates to computer systems. More particularly, the present invention relates to communicating between different types of devices on a low pin count bus in a computer system.

BACKGROUND

Conventional legacy-based computer systems include a variety of peripheral and memory devices that communicate with the system's chip-set or processor via an Industry Standard Architecture (ISA) bus or an Expansion bus (X-bus). The system chip-set or processor must include a large amount of pins (e.g., approximately 50–70 pins) and associated circuitry to support the ISA bus or X-bus signals that are used to interface the chip-set or processor with legacy-based peripheral devices including input/output (I/O) or I/O controller devices such as parallel port controllers, serial port controllers, super I/O controllers, floppy disk controllers, keyboard controllers, and memory devices such as non-volatile memory devices that store, for example, basic input-output services (BIOS) information.

The large number of pins needed to support the ISA bus and X-bus standards generally increases overall system cost. For example, larger packages are required for a chip-set or processor. Larger pin-count packages generally cost more than smaller pin-count packages, and are generally more susceptible to manufacturing quality and reliability problems during package assembly and system integration processes. Furthermore, larger pin-count packages require a greater amount of surface area on a printed circuit board (PCB) on which a computer system may be implemented. Therefore, it would be desirable to replace the ISA bus or X-bus in a computer system with a bus that would support the same types of peripheral devices, but utilize a relatively smaller number of pins or signal lines.

The ISA bus and X-bus standards also limit the amount of memory or I/O address space to 24 bits or approximately 16 MBytes of memory or I/O address space. As some processors and chip-sets can support 32 bits or 64 bits of address space, aliasing has previously been required to translate the processor address space to the ISA address space. Aliasing can produce significant overhead such that the performance of the computer system may be negatively impacted. Therefore, it would be desirable to replace the ISA bus and X-bus standards with a bus that may support an address space that is compatible with the processor or chip-set address space, and that potentially is unlimited.

The ISA bus and X-bus standards have a further disadvantage of being asynchronous. This generally increases design complexity for components that need to generate and respond to ISA bus and X-bus signals. Therefore, it would be desirable to replace the ISA bus and X-bus standards with a bus that may support synchronous communication between components so as to generally reduce the complexity of the bus interface circuitry.

SUMMARY OF THE INVENTION

A system is described including a host coupled to a memory device and a peripheral controller device. The host is coupled to the peripheral controller device via a bus having a plurality of general purpose signal lines to carry time-multiplexed address, data, and control information. The peripheral controller device performs direct memory access (DMA) transactions with the memory device via the host the bus.

Other features and advantages of the present invention will be apparent from the accompanying drawings and from the detailed description that follows.

BRIEF DESCRIPTION OF THE DRAWINGS

The features and advantages of the present invention are illustrated by way of example and not limitation in the figures of the accompanying drawings in which like references indicate similar elements and in which.

DETAILED DESCRIPTION

A computer system with a low pin count (LPC) bus is disclosed. The LPC bus may replace the ISA bus or X-bus in a computer system while providing a communication mechanism between a host, such as a processor or chip-set, and peripheral devices, such as I/O or I/O controller devices and memory devices. For one embodiment, the LPC bus may include general purpose signal lines that carry substantially all time-multiplexed address, data, and control information to implement memory, I/O, direct memory access (DMA), and bus master transactions between the host and the peripheral devices.

An intended advantage of the LPC bus is that it may require significantly fewer signal lines (e.g., approximately 6–8 signal lines) to perform all of the functions previously performed by the approximately 50–70 signals lines of the ISA bus and X-bus standards. Since the number of signals lines for the LPC bus may be greatly reduced over the ISA bus and X-bus standards, the number of pins required on a computer system's chip-set or processor to support the LPC bus may be significantly reduced. Similarly, an LPC interface included within each peripheral device may use an equally small number of pins to interface with the chip-set or processor via the LPC bus. This may result in lower packaging costs for the component manufacturer and lower system costs for the computer system manufacturer. Additionally, this may result in higher quality and more reliable packaging and system integration.

Another intended advantage of the LPC bus is that memory and/or I/O address space is not limited to a particular number of address lines in a communication bus; rather, the LPC bus may serially carry as many address signals as are required to address any address space. Thus, conventional aliasing of memory or I/O address space may be avoided.

Another intended advantage of the LPC bus is that the LPC interface logic and/or software that may be used to interface a chip-set or processor with a peripheral device may be software compatible with existing computer systems employing ISA bus or X-bus standards. That is, no special driver or configuration is required by operating system software or application programs to run on an LPC bus system vs. ISA bus or X-bus systems.

Still another intended advantage of the LPC bus is that it may be a synchronous bus enabling LPC interface circuitry within host and peripheral devices to generally require less complex circuitry than asynchronous bus interface designs.

Figure 1:
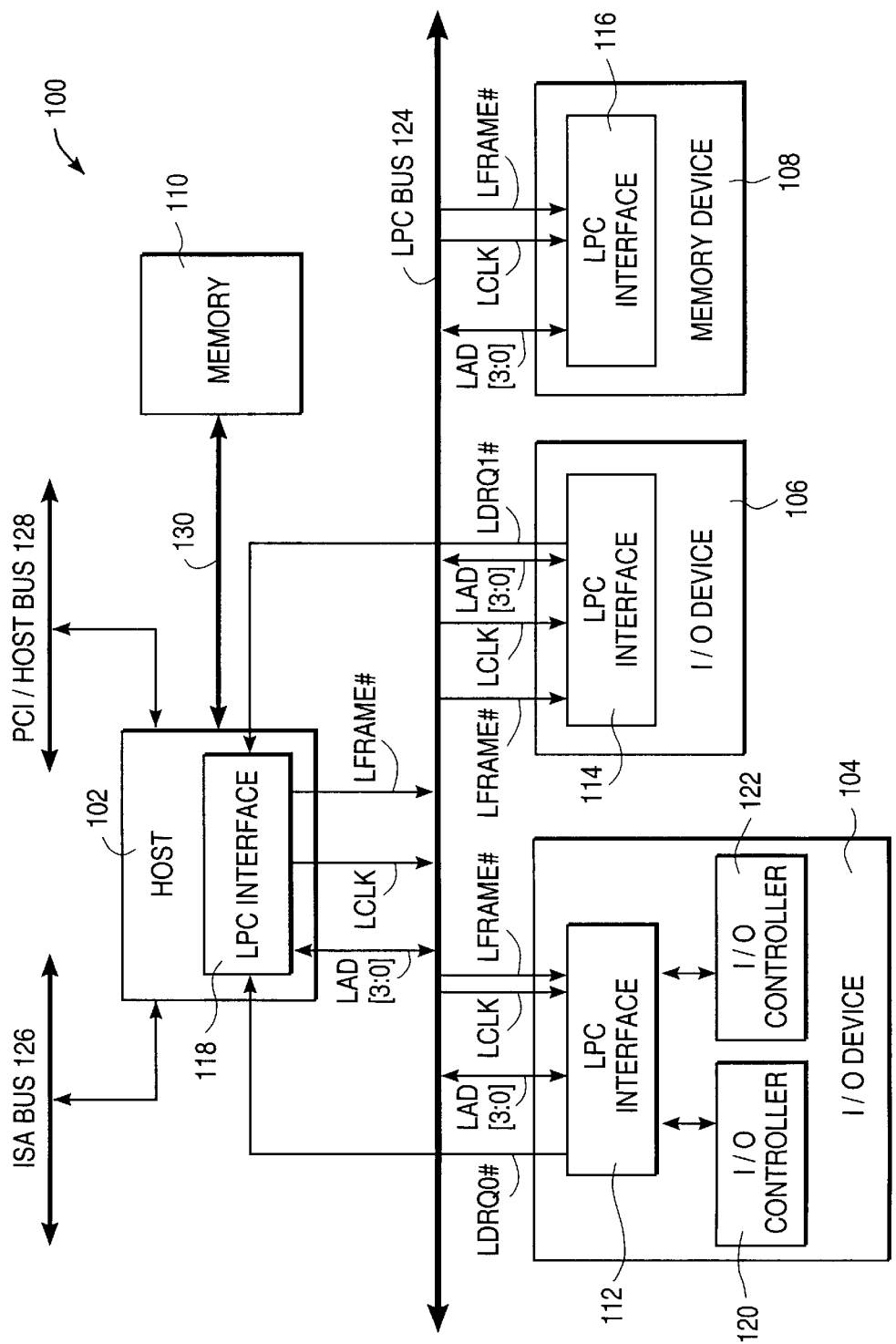
FIG. 1 is one embodiment of a computer system having a low pin count (LPC) bus.

FIG. 1 is one embodiment of computer system 100 including a host 102 coupled to peripheral devices including I/O or I/O controller devices 104 and 106, and memory device 108 via an LPC bus 124. Host 102 may be a chip-set, processor, or any other control logic that includes intelligence for interfacing with LPC bus 124. Host 102 may also include the necessary logic to interface with an optional ISA bus 126 and an optional PCI or Host bus 128. Host 102 communicates address, data, and control information with memory 110 over bus 130 that may be a local bus or other memory bus. Memory 110 may be the main or primary memory for system 100 such as dynamic random access memory (DRAM), static random access memory (SRAM), or any other type of volatile or non-volatile memory that may store, for example, operating system software, application code, or program data.

I/O devices 104 and 106, may be I/O controller devices that are addressable in I/O address space and control access to peripheral components such as floppy disk drives, keyboards, and the like. I/O devices 104 and 106 may each be, for example, a floppy disk controller, a serial port controller, a parallel port controller, an infra-red (IR) controller, a keyboard controller, audio controller device, or video controller device. I/O device 104 may be a Super I/O device that includes I/O controllers 120 and 122 that may each be, for example, a floppy disk controller, a serial port controller, a parallel port controller, an infra-red (IR) controller, a keyboard controller, audio controller device, or video controller device.

Memory device 108 is a peripheral device that is addressable in memory space. For example, memory device 108 may include any type of volatile or nonvolatile memory such as DRAM, SRAM, flash memory, electrically programmable read only memory (EPROM), electrically erasable programmable read only memory (EEPROM), magnetic storage media, or optical storage media. Memory device 108 may store system start-up code, manageability code, operating system data, application code, program data, or function as a scratch pad for host 102 or I/O devices 104 and 106. System start-up code may include the necessary software to configure or boot components within system 100, and may include BIOS information.

Each of host 102 and the peripheral devices 104, 106, and 108 include LPC interfaces 118, 112, 114, and 116, respectively, for generating LPC signals and for responding to LPC signals on LPC bus 124. These LPC interfaces may enable system 100 to implement memory, I/O, DMA, and bus master transactions over LPC bus 124. Each LPC interface has either input or output pin(s) to receive or transmit signals LAD[3:0], LCLK, and LFRAME#. Note that a pound symbol "#" following a signal name indicates that the signal is an active low signal. For alternative embodiments, active low signals may be altered to be active high signals.

The LAD[3:0] signal lines are general purpose signal lines that carry time-multiplexed address, data, and control information over LPC bus 124 and between host 102 and peripheral devices 104, 106, and 108. Whether LAD[3:0] is carrying address, data, or control information at any given time may be determined by the operating context of system 100 as will be described in greater detail below. While LAD[3:0] is illustrated as a four-bit bus, it may include any number of signal lines to carry out an intended purpose of carrying time-multiplexed address, data, and control information. A four-bit nibble-sized bus may be advantageous to reduce the number of pins required on each of the LPC interfaces 112–118 and reduce the number of pins and package sizes of host 102 and peripheral devices 104, 106, and 108.

LCLK is a clock signal that may be generated by LPC interface 118 or by other circuitry within host 102 (not shown). Alternatively, LCLK may be generated by a system clock (not shown) including a crystal or other timing circuitry. For one embodiment, LCLK may be the PCI clock from PCI bus 128.

LFRAME# is generated by LPC interface 118 of host 102 to indicate the start and/or end of LPC transactions or cycles. Each of LPC interfaces 112, 114, and 116, may monitor or sample LFRAME# to determine when an LPC transaction may begin or end. For example, when LFRAME# is asserted (e.g., low) by host 102, LPC interfaces 112, 114, and 116 of peripheral devices 104, 106, and 108, respectively, monitor LAD[3:0] to determine whether the transaction or cycle is for them. Advantageously, when a transaction is not intended for a particular peripheral device, that peripheral device may enter a lower power mode and may de-couple its state machines from the bus and/or gate its clocks. If LFRAME# is asserted for more than one LCLK cycle, then LPC interfaces 112, 114, and 116 may only react to the start control information on LAD[3:0] during the last LCLK cycle that LFRAME# is active. Table 1 summarizes exemplary definitions of the start control information on LAD[3:0] while LFRAME# is asserted.

TABLE 1

| LAD[3:0] | Function |
|---|---|
| 0000 | Start of transaction |
| 0001 | Reserved |
| 0010 | Grant for bus master 0 |
| 0011 | Grant for bus master 1 |
| 0100 | Reserved |
| 1101 | Memory read |
| 1110 | Memory write |
| 1111 | Stop/Abort transaction |

LFRAME# may also be used to abort or end LPC transactions. For example, LPC interfaces 112, 114, and 116 of peripheral devices, 104, 106, and 108, respectively, continue to monitor LFRAME# during LPC transactions. If LFRAME# is asserted during an LPC transaction, the peripheral devices 104, 106, and 108 will stop driving LAD[3:0] and abort their LPC transaction. For one embodiment, host 102 asserts LFRAME# for a number of LCLK cycles (e.g., four clock cycles) to ensure that the abort indication is recognized by all peripheral devices. During one or more of these LCLK cycles, host 102 may also drive predetermined data on LAD[3:0]. For one embodiment, host 102 drives 1111 on LAD[3:0] while LFRAME# is asserted to indicate an abort sequence. At the end of the abort sequence, LFRAME# may be deasserted before a new LPC transaction commences.

For alternative embodiments, LFRAME# may be used between any two devices (e.g., a host and peripheral device) in any system as an independent control signal on an independent control line (apart from a bus) to communicate the start or abortion of a transaction such as a memory, I/O, bus master, or DMA transaction.

LPC bus 124 may also include a reset signal LRESET# input into each of LPC interfaces 112, 114, 116, and 118 and that resets the LPC interfaces to a known state (e.g., an idle state). For one embodiment, LRESET# may be the same reset signal as a PCI reset signal on PCI bus 128.

I/O devices 104 and 106 may also have DMA request signals LDRQ0# and LDRQ1#, respectively, provided on separate control lines to LPC interface 118 of host 102. LDRQ0# and LDRQ1# may be used to transmit encoded DMA channel requests to host 102 prior to performing a DMA or bus master transaction. Each I/O device may have one unique LDRQ# signal such that peripheral device I/O controllers 120 and 122 share one DMA channel request on LDRQ0#.

Figure 8:
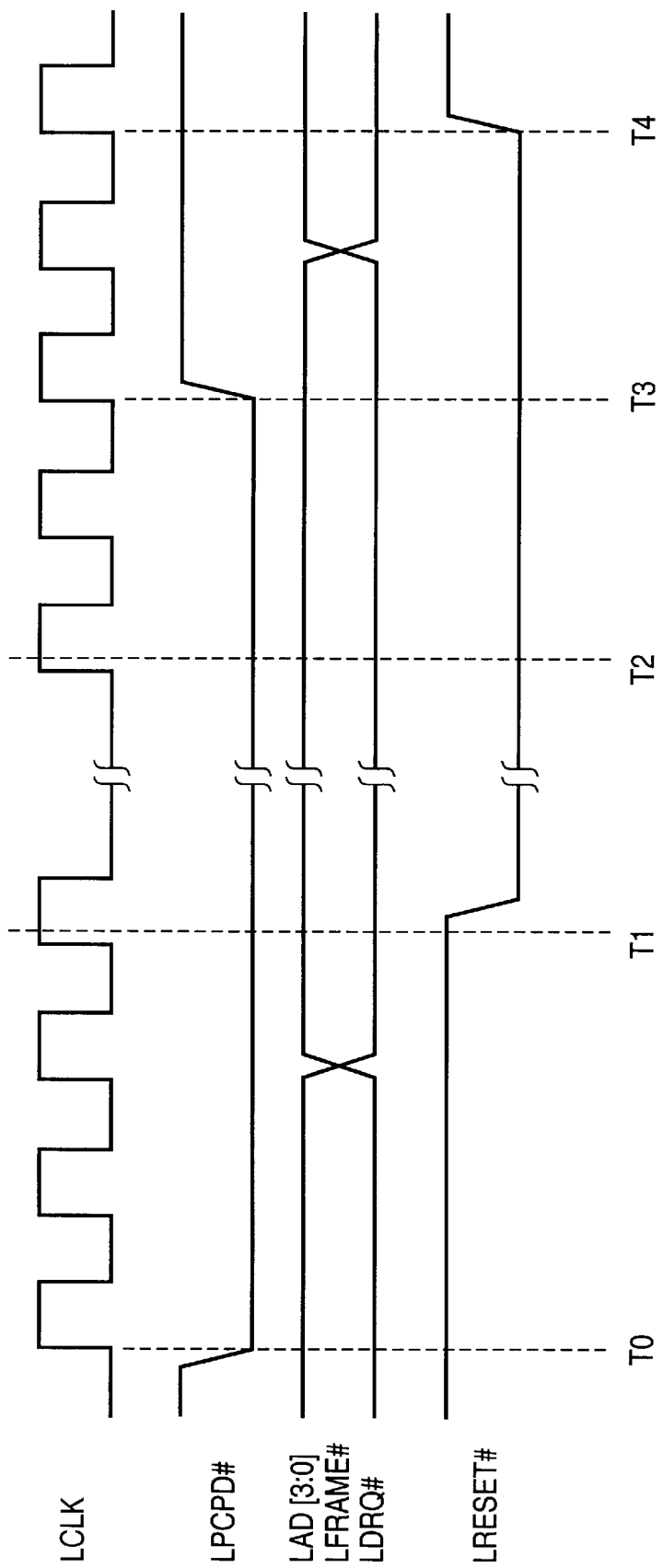
FIG. 8 is one embodiment of a timing diagram for a low power mode of operation.

LPC bus 124 may also include a low power or standby signal LPCPD# that may be output by host 102 to each of peripheral devices 104–108 on a separate control line. As illustrated in FIG. 8, host 102 may assert LPCPD# (e.g., low) asynchronously at time t0 to cause peripheral devices 104–108 to enter a low power mode. Upon recognizing LPCPD# asserted by host 102, peripheral devices 104–108 will halt any LPC transactions and tri-state or drive the LDRQ# signals inactive. Peripheral devices 104–108 and/or host 102 may also tri-state or drive LAD[3:0] to a known state. Host 102 may also drive LFRAME# to a known state (high or low) after asserting LPCPD#. In the low power mode, LCLK may be shut off at time t1 and peripheral devices 104–108 may shut off their states machines and/or other logic. For one embodiment, the time difference between t0 and t1 is at least 30 microseconds. When exiting the low power mode, LCLK may be restarted asynchronously at time t2 and may run for a period of time before LPCPD# may be deasserted at time t3. For one embodiment, the time difference between t2 and t3 is at least 100 microseconds. LRESET# may then be used to reset peripheral devices 104–108 from time t3 to t4. For one embodiment, the difference between times t3 and t4 is at least 60 microseconds.

Host 102 and peripheral devices 104–108 may also have additional sideband input and/or output signals utilized in ISA or PCI busses, including interrupt signals (e.g., SERIRQ and SMI#), additional clock signals (e.g., CLKRUN#), and power management signals as will be described in more detail below.

By utilizing approximately 6–9 signal lines, in one embodiment, LPC bus 124 may provide substantial signal and pin-count savings over conventional ISA bus or X-bus parts or systems. For example, the following ISA bus or X-bus signals typically found on plug-n-play devices may no longer be required: D[7:0], SA[15:0], DREQ[3:0], DACK#[3:0], TC, IOR#, IOW#, IOCHRDY, IOCS16#, and MEMCS16#. This may result in a savings of approximately 30–40 signals on the bus, the host, and/or peripheral devices. For one embodiment, a fully functional Super I/O peripheral controller device that may have required as large as a 160 pin package under ISA or X-bus compatible situations, may require an 88 pin (or less) package using an LPC interface as illustrated in FIG. 1.

The LPC bus may be used by the LPC interfaces 112–118 to perform memory, I/O, DMA, and bus master transactions or cycles including memory read, memory write, I/O read, I/O write, DMA read, DMA write, bus master memory read, bus master memory write, bus master I/O read, and bus master I/O write. The type of transaction may be indicated in a field of cycle type and direction control information driven on LAD[3:0] by host 102 or peripheral devices 104, 106, and 108. One embodiment of the cycle type and control information encoded on LAD[3:1] is shown in Table 2. Other encodings on the same or other lines may be used.

TABLE 2

| LAD[3:1] | Transaction |
| --- | --- |
| 000 | I/O Read |
| 001 | I/O Write |
| 010 | Memory Read |
| 011 | Memory Write |
| 100 | DMA Read |
| 101 | DMA Write |
| 110–111 | Reserved |

Figure 2:
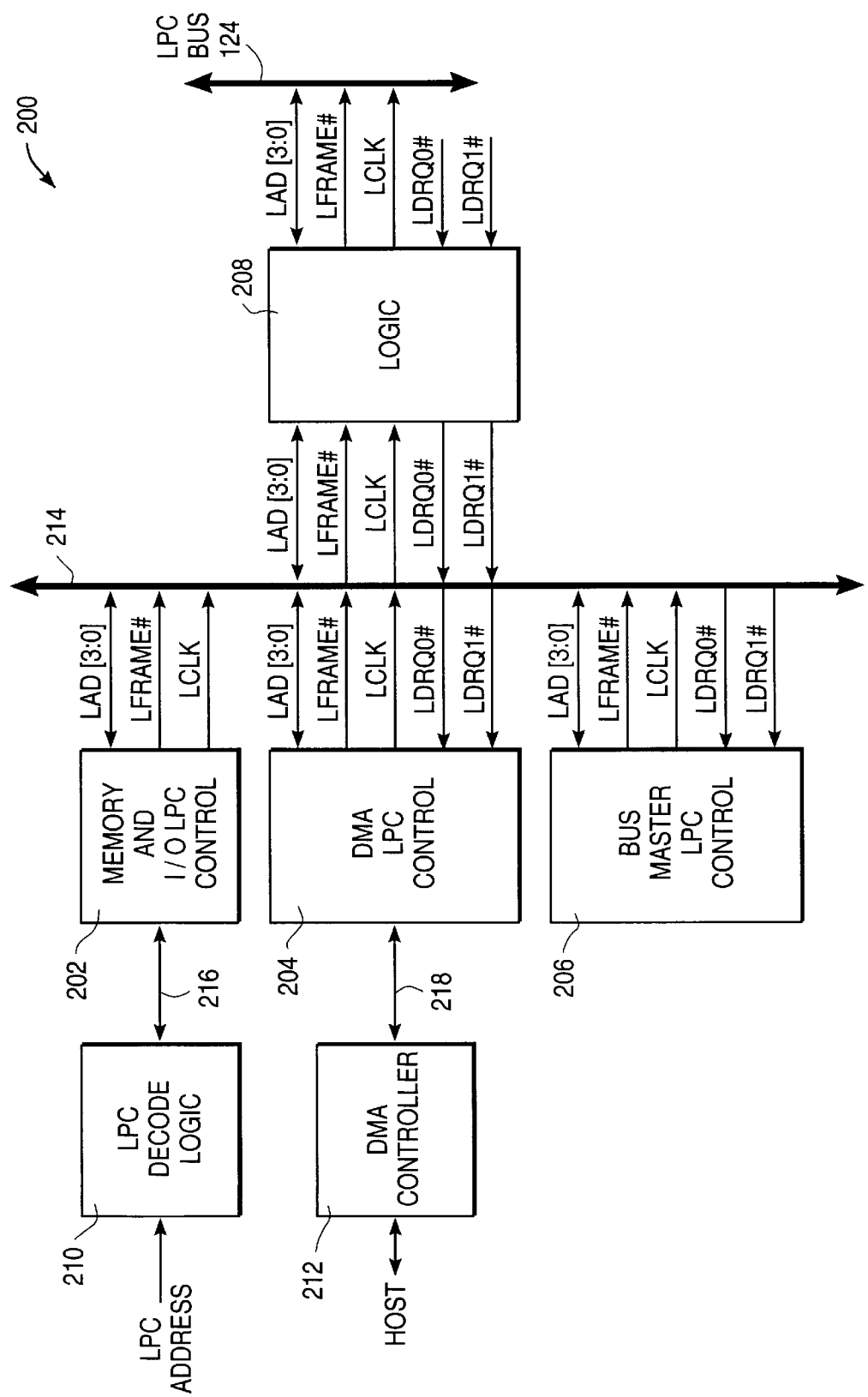
FIG. 2 is one embodiment of an LPC interface for a host.

FIG. 2 shows LPC interface 200 that is one embodiment of LPC interface 118 of host 102. LPC interface 200 generates and interprets the address, data, and control information on LPC bus 124 to implement the transactions of Table 2. LPC interface 200 includes memory and I/O LPC control logic 202 that may control memory read, memory write, I/O read, and I/O write LPC transactions between host 102 and one of peripheral devices 104–108. Memory and I/O LPC control logic 202 may include a state machine or sequencer for sequencing between the states necessary for the particular LPC transaction, and for generating address, data, or control information on LAD[3:0], LFRAME#, and/or LCLK. The information provided on LAD[3:0], LFRAME#, and/or LCLK may be provided to bus 214 for output by logic 208 to LPC bus 124.

For one embodiment, memory and I/O LPC control logic 202 determines that an LPC memory or I/O transaction may be required to be performed by communication with LPC decode logic 210 over one or more signals 216. LPC decode logic 210 may receive memory or I/O read or write request and an associated address from host 102, ISA bus 126, or PCI or host bus 128. LPC decode logic may decode the address and signal memory and I/O LPC control logic 202 to begin a memory or I/O LPC transaction. LPC decode logic 210 may alternatively be located outside of LPC interface 200 but within host 102. The decoded address ranges for peripheral device 104–108 may be defined so as to be compatible with previous ISA bus and X-bus legacy based peripheral devices to aide is making LPC transactions software transparent to operating system software and application software. For an alternative embodiment, control of the memory and I/O LPC transactions may be separated into different control circuits.

LPC interface 200 also includes DMA LPC control logic 204 that controls DMA read and write LPC transactions between host 102 and one of I/O devices 104 and 106. DMA LPC control logic 204 may include a state machine or sequencer for sequencing between the states necessary for the DMA LPC transaction, and for generating address, data, or control information on LAD[3:0], LFRAME#, and/or LCLK, and for receiving DMA request signals LDRQ0# and LDRQ1#. The information provided on LAD[3:0], LFRAME#, LDRQ0#, LDRQ1#, and/or LCLK may be provided to or from LPC bus 124 via logic 208 and bus 214.

DMA LPC control logic 204 may interface with host 102 and memory 110 via DMA controller 212 that may reside in host 102. DMA LPC control logic 204 may communicate with DMA controller 212 over one or more signals 218. For one embodiment, DMA controller 212 may include one or more 8237 or 8237-compatible DMA controllers. DMA controller 212 may perform arbitration within host 102 on behalf of a DMA channel such that the I/O device using that DMA channel may communicate with main memory 110 via host 102.

LPC interface 200 may also include bus master LPC control logic 206 that control bus master memory read and write LPC transactions, and bus master I/O read and write LPC transactions between host 102 and peripheral devices 104–108. Bus master LPC control logic 206 may include a state machine or sequencer for sequencing between the states necessary for the bus master LPC transactions, and for generating address, data, or control information on LAD[3:0], LFRAME#, and/or LCLK, and for receiving DMA request signals LDRQ0# and LDRQ1#. The information provided on LAD[3:0], LFRAME#, LDRQ0#, LDRQ1#, and/or LCLK may be provided to or from LPC bus 124 via logic 208 and bus 214.

Logic 208 may comprise one or more buffers or transceivers for interfacing LPC bus 124 with LPC bus 214. Alternatively, LPC interface 200 may not include bus 214; rather, logic 208 may be connected directly and individually to the input and output signals of memory and I/O LPC control logic 202, DMA LPC control logic 204, and bus master LPC control logic 206. For this alternative embodiment, logic 208 may be a selector or multiplexer circuit that outputs or inputs the appropriate LPC signals to and from LPC bus 124 and control logic 202, 204, and 206 under the control of host 102.

Figure 3:
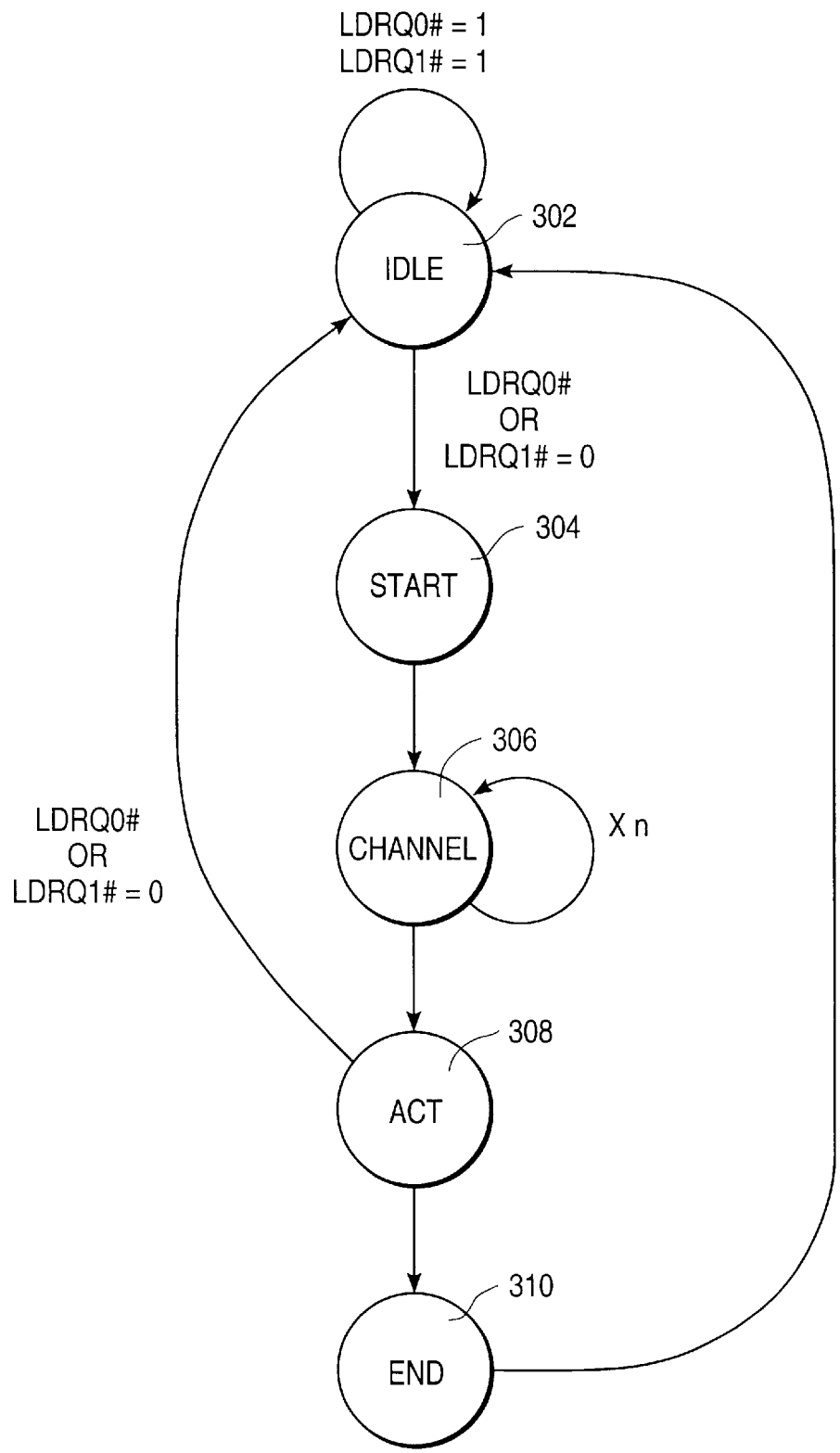
FIG. 3 is one embodiment of a state machine diagram for implementing a direct memory access (DMA) request.

FIG. 3 is one embodiment of a state diagram for performing a DMA request on one or more of the DMA request control lines LDRQ0# or LDRQ1#. The state diagram of FIG. 3 may be implemented by state machines or control logic in LPC interface 118 of host 102 (e.g., DMA LPC control logic 204 of FIG. 2), or by state machines or control logic in LPC interfaces 112 and 114 of I/O devices 104 and 106, respectively. For alternative embodiments, the state diagram may be implemented by state machines or control logic in any system having a host device and an I/O device that requests a DMA channel over a control line that is independent of a general purpose bus.

As previously described, I/O devices 104 and 106 may provide DMA request signals LDRQ0# and LDRQ1#, respectively, on separate control lines to LPC interface 118 of host 102. LDRQ0# and LDRQ1# may be used to transmit encoded DMA or bus master channel requests to host 102. Each I/O device may have one unique dedicated LDRQ# signal such that peripheral device I/O controllers 120 and 122 may share one DMA or bus master request line LDRQ0#.

Figure 4:
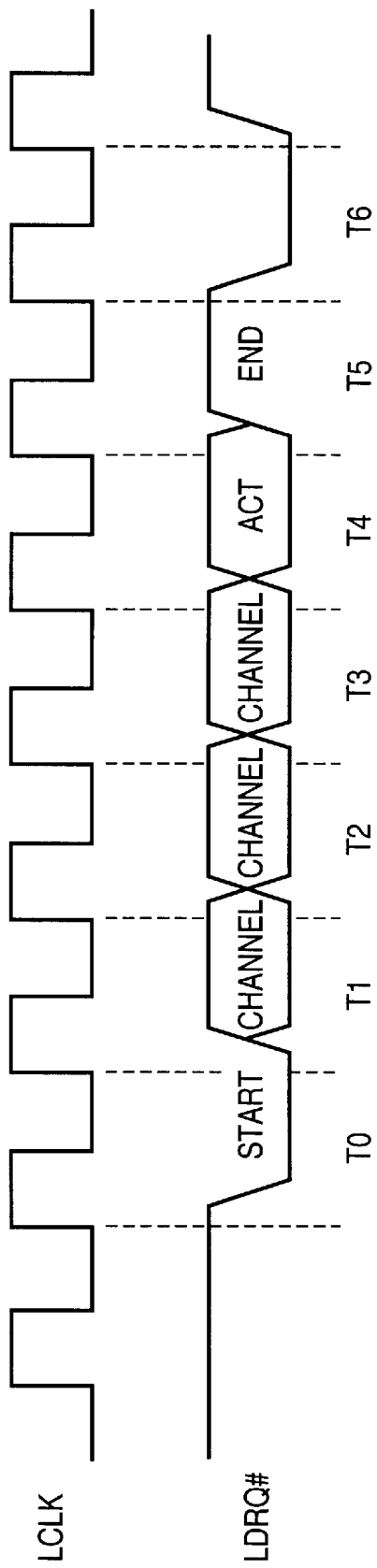
FIG. 4 is one embodiment of a DMA request transaction.

The operation of FIG. 3 will be described with the aide of the exemplary timing diagram of FIG. 4. In state 302, LPC interfaces 112, 114, and 116 are in an idle DMA state with LDRQ0# and LDRQ1# deasserted (e.g., high). When, for example, I/O device 104 asserts LDRQ0# (e.g., low) to request a DMA transaction with from host 102, the process transitions to start state 304 during cycle T0. Host 102 recognizes that LDRQ0# has been asserted and prepares to receive a requested DMA channel number from I/O device 104.

The process then transitions to state 306 where the requested channel number may be serially and synchronously transmitted on LDRQ0# from I/O device 104 to host 102 during clock cycles T1, T2, and T3. Three clock cycles may be used to encode up to eight different DMA channels using a binary format. For alternative embodiments, a different number of serial bits may be transmitted to encode any number of DMA channels. For yet other embodiments, encoding schemes other than a binary encoding scheme may be used. The channel number may also be serially transmitted most significant bit first, least significant bit first, or in any other order expected by host 102.

After the channel number has been transmitted, the process transitions to state 308 in which I/O device 104 may send an active bit (ACT) or signal to host 102 on LDRQ0# in clock cycle T4. The ACT bit may indicate if the current DMA request is an active or inactive request. For example, if the ACT bit is active (e.g., high), a DMA controller of host 102 may attempt to arbitrate for access to memory 110. After an active ACT bit is received by host 102, I/O device 104 may drive LDRQ0# to a predetermined state (e.g., high or low) for one or more clock cycle(s) T5 in end state 310. A DMA transaction may then occur starting at cycle T6 or at any time thereafter. If, however, the ACT bit is inactive (e.g., low), host 102 may interpret this DMA request as attempting to abandon a previous DMA request for the channel number indicated in clock cycles T1–T3. That is, when ACT is inactive, I/O device 104 may request that host 102 abandon a previous DMA request. The process may then transition back to idle state 302.

The LPC interfaces 112, 114, and 118 may also support multiple pipelined serial DMA requests. For example, a first DMA request may be processed for a first channel on LDRQ0# for I/O controller 120 of I/O device 104. Subsequently, either before, during, or after the actual DMA transaction over the first channel, a second DMA request may be made and processed for a second channel on LDRQ0# for I/O controller 122. For one embodiment, host 102 performs the second DMA transaction immediately after the first DMA transaction. Without pipelining there may be a delay between DMA transactions while host 102 processes the second DMA request on LDRQ0# or LDRQ1#.

Figure 5:
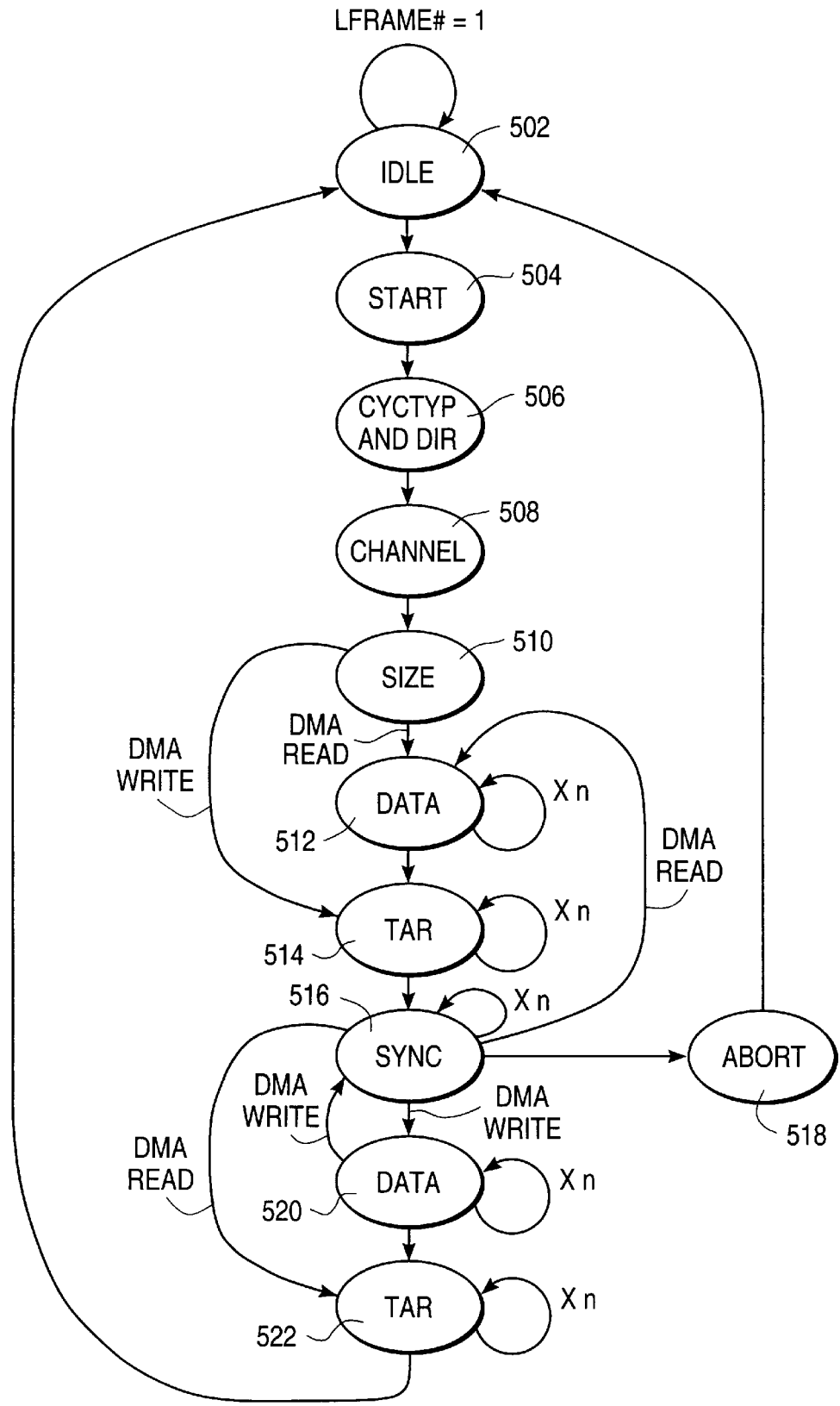
FIG. 5 is one embodiment of a state machine for implementing DMA read and write transactions.

After a DMA request has been made, host 102 may arbitrate to gain access to memory 110 such that data files, driver information, application code, and the like may be communicated between I/O devices 104–106 and memory 110 via host 102. Once access to memory 110 has been achieved by host 102 (e.g., by DMA controller 212 of FIG. 2), a DMA write or DMA read transaction may occur over LPC bus 124. FIG. 5 is a state diagram of DMA write and read transactions that may occur over LPC bus 124. The state diagram of FIG. 5 may be implemented in each of LPC interfaces 112, 114, and 118. For example, the state diagram of FIG. 5 may be implemented in DMA LPC control logic 204 of FIG. 2.

Figure 6:
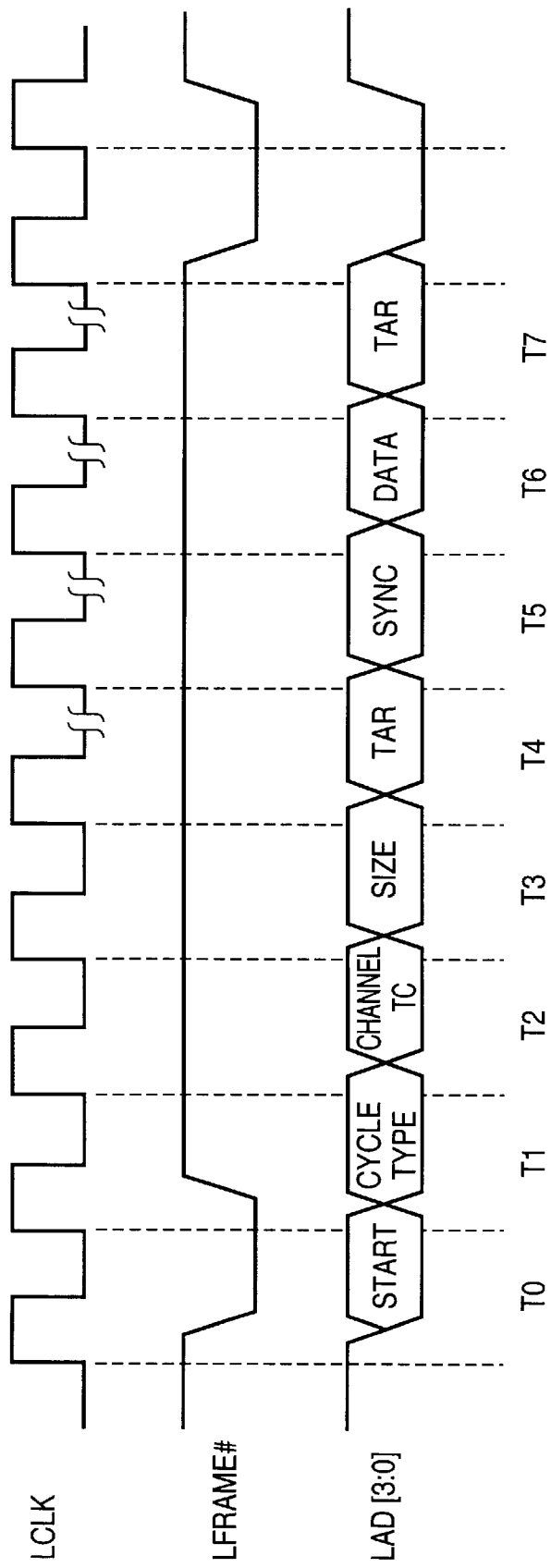
FIG. 6 is one embodiment of a DMA write transaction.

A DMA write transaction between LPC interface 112 of I/O device 104, LPC interface 118 of host 102, and memory 110 will be described with the aide of the exemplary timing diagram of FIG. 6. The DMA write transaction may include LPC interface 118 reading data from I/O device 104, and then writing this data to memory 110.

The process begins at state 502 in which LPC interfaces 118 and 112 are idle when LFRAME# is deasserted (e.g., high). When, host 102 wins access to memory 110 for the channel previously requested by I/O device 104 (e.g., the process of FIG. 3), a DMA transaction commences at state 504 when LFRAME# is asserted (e.g., low) by host 102 during cycle T0. Host 102 drives start control information indicating the start of an LPC transaction on LAD[3:0] during cycle T0. For example, the start control information may be 0000 as indicated in Table 1.

The process then transitions to state 506 in which host 102 drives cycle type and direction control information on LAD[3:0] during cycle T1. The cycle type and direction control information indicates to peripheral 104 that the LPC transaction is a DMA write transaction. For example, the cycle type and direction control information may be 101 on LAD[3:1] as indicated in Table 2.

The process then transitions to state 508 and host 102 may drive channel number control information onto LAD[2:0] during clock cycle T2. The channel number represents the DMA channel number that is granted by host 102 during this process. The channel number may match a channel number contained in a previous DMA request by I/O device 104 over LDRQ0#. The channel number may be encoded in a binary format, or in any other format. One embodiment of the binary encodings are illustrated in Table 3 below.

TABLE 3

| LAD[2:0] | Channel Number |
|---|---|
| 000 | 0 |
| 001 | 1 |
| 010 | 2 |
| 011 | 3 |
| 100 | Reserved |
| 101 | 5 |
| 110 | 6 |
| 111 | 7 |

Terminal count control information may also be transmitted by host 102 on LAD[3] during the same clock cycle T2 that the channel number is driven onto LAD[2:0]. The terminal count control bit may indicate a last byte of transfer based upon the size of the DMA transaction (described below). For example, if the size of the DMA transaction is 8 bits and the TC bit is set (e.g., high), then this may be the last byte of data for the DMA write transaction. Similarly, if the TC bit is set for a 16 bit DMA write transaction, then the second byte following the TC bit may be the last byte for the DMA write transaction.

The process next transitions to state 510 and host 102 drives size control information on LAD[1:0] during clock cycle T3. The size control information indicates the number of bytes of I/O data to be read from I/O device 108 and written to memory 110 via host 102. Table 4 provides one embodiment of encoding the number of bytes on LAD[1:0] to be subsequently transferred over LAD[3:0]. Other encodings on the same or different LAD signal lines may also be used.

TABLE 4

| LAD[1:0] | Size |
|---|---|
| 00 | 8 bits (1 byte) |
| 01 | 16 bits (2 bytes) |
| 10 | Reserved |
| 11 | 32 bits (4 bytes) |

For an alternative embodiment, the size control information may indicate that $2^{size}$ number of bytes of I/O data to be read from I/O device 108 and written to memory 110 via host 102.

Each of the DMA channels may have dedicated sizes. For one embodiment, channels 0–3 may each be 8 bit channels, and channels 5–7 may each be 16 bit channels. If dedicated channel sizes are employed, LPC interface 118 may transmit size control information that matches the channel size for the channel granted the DMA write transaction. For alternative embodiments, larger sizes of data may be transferred across smaller channel sizes, or smaller sizes of data may be transferred across larger channel sizes.

The process may then transition to turn around (TAR) state 514 to turn control of LPC bus 124 over to I/O device 104 during n clock cycle(s) T4. Control of LPC bus 124 may be turned over to I/O device 104 such that it may output its DMA write data to LAD[3:0]. For one embodiment, state 514 is two clocks wide. In the first clock cycle host 102 drives LAD[3:0] lines with predetermined control information (e.g., 1111). In the second clock cycle, host 102 may tri-state LAD[3:0] lines. These lines may have weak pull-ups attached to these lines so that they may remain at a logical high states. For other embodiments, n may be one clock cycle or greater than two clock cycles to turn around LAD[3:0].

The process then transitions to state 516 and wait n clock cycles while I/O device 104 drives inband synchronization control information on LAD[3:0] during n clock cycle(s) T5. The synchronization control information may be used to add wait states until the data is ready to be output by I/O device 104. In this manner, I/O devices of differing speeds or access times may be coupled to the same LPC bus. Conventionally, a dedicated control signal on a dedicated control line was used to indicate when data was ready (e.g., IOCHRDY in the ISA bus or X-bus). In contrast, I/O device 104 may use inband signaling on LAD[3:0] to insert wait states without requiring the use of an additional dedicated pin or signal line.

For one embodiment, the synchronization control information field may have two phases. The first phase drives first control information on LAD[3:0] (e.g. 0101 or 0110 on LAD[3:0]) while accessing the DMA write data. The second phase drives second control information on LAD[3:0] (e.g., 0000 LAD[3:0]) indicating that the data is ready to be output to LPC bus 124. Host 102 monitors the synchronization control information to determine when DMA write data for the DMA transaction will be output on LAD[3:0] by I/O device 104 in subsequent clock cycles T6. For one embodiment, the first control information may have an encoding (e.g., 0110 on LAD[3:0]) that indicates that I/O device 104 may drive a relatively large number of wait states onto LAD[3:0] (e.g., approximately 20+ wait states). The first control information may also have an encoding (e.g., 0101 on LAD[3:0]) that indicates that I/O device 104 may drive a relatively small number of wait states onto LAD[3:0] (e.g., approximately 1–20 wait states). For one example (see Table 5 below), I/O device 104 may drive synchronization data of 0101 on LAD[3:0], respectively, for approximately 1–20 clock cycles and then drive one cycle of 0000 on LAD[3:0], respectively, to indicate that the requested data is ready and will be output on the following clock cycle.

If the number of wait states is large, host 120 may decide to abort the transaction by entering state 518. As previously described, host 102 may abort the transaction by asserting LFRAME# for one or more clock cycles and driving predetermined abort control information (e.g., 1111 as in Table 1) on LAD[3:0].

The field of synchronization control information may also be used by I/O device 104 to send an inband error message on LAD[3:0] to host 102. The error message may be sent at any time during the synchronization sequence. For example, it may be sent as the second control information in the embodiment having first and second synchronization control information. The error message may indicate, for example, that the data is corrupted in some way, the peripheral device does not understand the request, an invalid request was made, or that a request has been while the peripheral device is in a power down mode or is in another mode in which it is not ready or able to output data. For another embodiment, the error message may indicate that a floppy disk controller may have overrun its FIFO. The error message may cause the DMA write transaction to abort.

For another embodiment, I/O device 104 may indicate an error condition by driving synchronization control information of 0000 or 1010 on LAD[3:0] of an odd byte of a 16 bit or 32 bit transfer.

Table 5 provides one embodiment of encodings on LAD [3:0] for the synchronization control information described above. Other encodings may also be used.

TABLE 5

| LAD[3:0]   | Indication         |
|------------|--------------------|
| 0000       | Ready              |
| 0001–0100  | Reserved           |
| 0101       | Short Wait         |
| 0110       | Long Wait          |
| 0111–1000  | Reserved           |
| 1001       | DMA Ready More     |
| 1010       | Error              |
| 1011       | Reserved           |
| 1100       | Ready No More Sync |
| 1101–1111  | Reserved           |

For alternative embodiments, the in-band synchronization control information may be used between any two devices (e.g., a I/O device 104 and host 102) over a general purpose time-multiplexed bus in any system to communicate wait state, error, or any other information previously described or summarized in Table 5.

I/O device 104 may use the synchronization control information with each byte of data transferred to host 102 over LAD[3:0] to indicate to host 102 whether this is the last byte of transfer or if more bytes are requested to be transferred. For one embodiment, ready with no error (e.g., 0000) or ready with error (e.g., 1010) may indicate to host 102 that the byte of data that follows in cycle T6 is the last byte of data for the DMA write transaction. I/O device 104 may keep the DMA request active by driving DMA Ready More control information (e.g., 1001 in Table 5) on LAD[3:0] before cycle T6. This may indicate to host 102 that more data bytes are requested to be transferred after the current byte. Host 102 may, at a later time, begin the DMA write transaction again from state 502 to access the additional data.

When I/O device 104 is ready to output its data to LPC bus 124 after providing the appropriate synchronization control information on LAD[3:0] (e.g., 0000), the process transitions to state 520 for n clock cycle(s) T6. I/O device 104 may drive data onto LAD[3:0] in byte increments over two clock cycles. For each byte, data may be output by I/O device 104 low nibble first, high nibble first, or in any other format. If the DMA write transaction is a 16 bit or 32 bit transfer (or higher), the process may repeat states 516 and 520 as many time as required to transfer the required bytes of data to host 102. Each group of bytes output by I/O device 104 may be output low byte first, high byte first, or in any other format. The data read from I/O device 104 may then be written to memory 110 by host 102. Host 102 may also support a verify mode in which the process of FIG. 5 is carried out without the additional step of writing data read from I/O device 104 to memory 110.

After all of the data has been output by LPC interface 112 of I/O device 104, the process transitions to turn around (TAR) state 522 in which control of LAD[3:0] is returned to host 102 during n clock cycle(s) T7. As in state 514, state 522 may be two clocks wide. In the first clock cycle I/O device 104 drives LAD[3:0] lines with predetermined control information (e.g., 1111). In the second clock cycle, I/O device 104 may tri-state LAD[3:0] lines. For other embodiments, n may be one clock cycle or greater than two clock cycles to turn around LAD[3:0].

Figure 7:
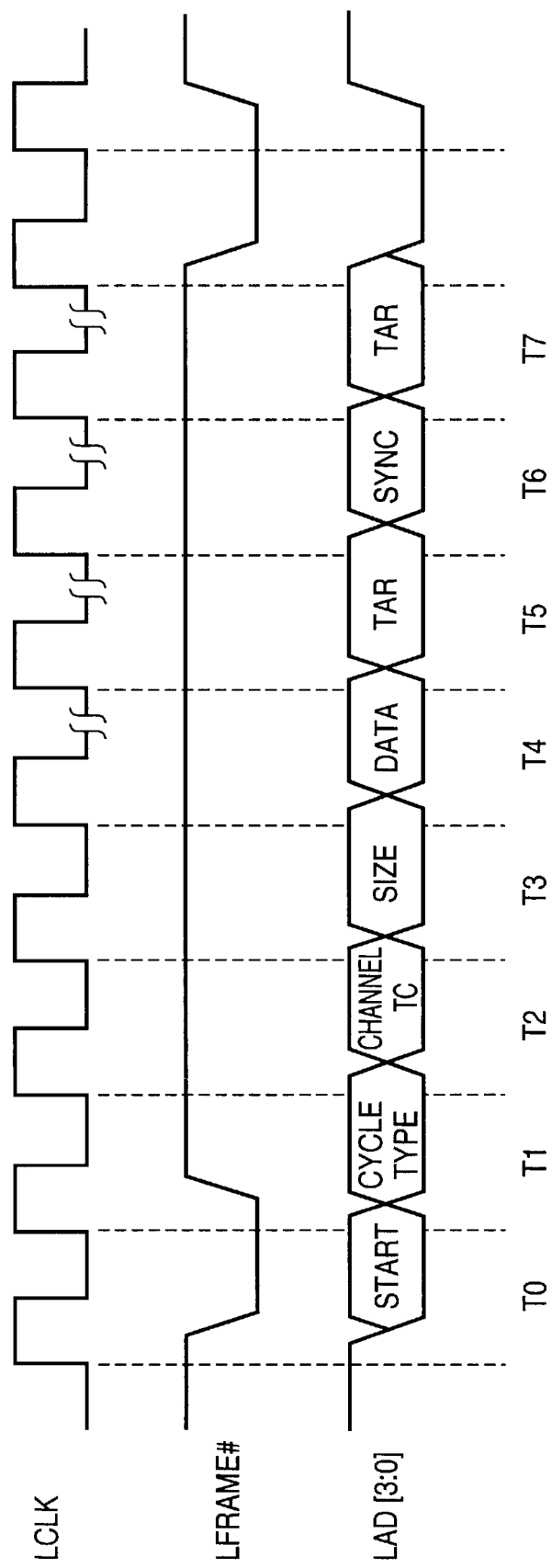
FIG. 7 is one embodiment of a DMA read transaction.

A DMA read transaction between LPC interface 112 of I/O device 104, LPC interface 118 of host 102, and memory 110 will be described with the aide of the exemplary timing diagram of FIG. 7.

The process begins at state 502 in which LPC interfaces 118 and 112 are idle when LFRAME# is deasserted (e.g., high). When, host 102 gains access to and reads memory data from memory 110, LFRAME# is asserted (e.g., low) by host 102 during cycle T0. Host 102 also drives start control information indicating the start of an LPC transaction on LAD[3:0] during cycle T0. For example, the start control information may be 0000 as indicated in Table 1. The process then transitions to state 506 in which host 102 drives cycle type and direction control information on LAD[3:0] during cycle T1. The cycle type and direction control information indicates to peripheral 104 that the LPC transaction is a DMA read transaction. For example, the cycle type and direction control information may be 100 on LAD[3:1] as indicated in Table 2.

The process then transitions to state 508 and LPC interface 118 drives channel number control information onto LAD[2:0] during clock cycle T2. The channel number represents the DMA channel number that is granted by host 102 during this process. Terminal count control information may also be transmitted by host 102 on LAD[3] during the same clock cycle T2 that the channel number is driven onto LAD[2:0]. The terminal count control bit may indicate a last byte of transfer based upon the size of the DMA transaction. The process then transitions to state 510 and host 102 drives size control information on LAD[1:0] during clock cycle T3.

The process then transitions to state 512 where host 102 writes one or more bytes of the memory data to I/O device 104 in n clock cycle(s) T4 via LAD[3:0]. Host 102 may drive data onto LAD[3:0] in byte increments over two clock cycles. For each byte, data may be output by host 102 low nibble first, high nibble first, or in any other format. Similarly, each group of bytes output by LPC interface 118 may be output low byte first, high byte first, or in any other format.

When the writing is complete, the process transitions to turn around (TAR) state 514 to turn control of LPC bus 124 over to I/O device 104 during n clock cycle(s) T4. The process then transitions to state 516 and waits n clock cycles while I/O device 104 drives inband synchronization control information on LAD[3:0] during n clock cycle(s) T5. For one embodiment, the synchronization control information may be one or more clock cycles and used to indicate (1) the receipt of the memory read data into I/O device 104 (e.g., 0000 on LAD[3:0]), that an error condition has occurred (e.g., 1010 on LAD[3:0]), (2) that the byte received in cycle T4 may be the last byte of memory data (e.g., 0000 on LAD[3:0]), or (3) that the I/O device 104 may keep the DMA request active for more DMA transfers (e.g., 1001 on LAD[3:0]).

If the DMA read transaction is a 16 bit or 32 bit transfer (or higher), the process may repeat states 512, 514, and 516 as many times as are required to transfer enough bytes of the memory read data to I/O device 104. The process then transitions to turn around (TAR) state 522 in which control of LAD[3:0] is returned to LPC interface 118 and host 102 during n clock cycle(s) T7.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A system comprising:
    a bus having a plurality of general purpose signal lines to carry time-multiplexed address, data, and control information;
    a host coupled to the bus;
    a memory coupled to the host;
    a peripheral controller coupled to the bus, the peripheral controller performing a direct memory access (DMA) transaction with the memory via the host and the bus; and
    a first control line separate from the bus coupled to the host and the peripheral controller, the first control line to serially transmit an encoded direct-memory access (DMA) channel number from the peripheral controller to the host.

2. The system of claim 1 wherein the bus comprises a second control line to carry a control signal from the host to the peripheral controller, the control signal being used with first control information from the host to indicate the start of the DMA transaction.

3. The system of claim 2, wherein the host writes second control information to the peripheral controller via the bus to indicate the DMA transaction is a read or write DMA transaction.

4. The system of claim 2, wherein the host writes second control information to the peripheral controller via the bus to indicate the DMA channel number of the DMA transaction.

5. The system of claim 2, wherein the host writes second control information to the peripheral controller via the bus to indicate a number of bytes in the DMA transaction.

6. The system of claim 2, wherein the host writes second control information to the peripheral controller indicating a last byte of data in the DMA transaction.

7. The system of claim 2, wherein the host provides second control information to the bus to turn control of the bus over to the peripheral controller.

8. The system of claim 2, wherein the peripheral controller drives synchronization control information on the bus.

9. The system of claim 8, wherein the synchronization control information indicates that data is not ready to be read from the peripheral controller in a DMA write transaction.

10. The system of claim 8, wherein the synchronization control information indicates that data has been received by the peripheral controller in a DMA read transaction.

11. The system of claim 8, wherein the synchronization control information indicates that there is an error in the DMA transaction.

12. The system of claim 8, wherein the synchronization control information indicates that an additional transfer of data for the DMA transaction is requested by the peripheral controller.

13. The system of claim 1, wherein the host comprises a processor.

14. The system of claim 1, wherein the host comprises a chip-set.

15. A method of performing a direct memory access (DMA) write transaction from a peripheral controller to a memory via a host, the peripheral controller and the host being coupled to a bus having a plurality of general purpose signal lines, the method comprising:
    requesting a DMA channel number from the host by serially transmitting a plurality of signals to designate the DMA channel number over a first control line which is separate from the bus;
    granting the DMA write transaction to the peripheral controller by transmitting first control information over the bus;
    transmitting data from the peripheral controller to the host over the bus; and
    writing the data to the memory.

16. The method of claim 15, further comprising: asserting an indication of a start of the DMA write transaction on a second control line.

17. The method of claim 15, further comprising: transmitting second control information indicating a number of bytes in the DMA write transaction from the host to the peripheral controller over the bus.

18. The method of claim 15, further comprising: transmitting an indication of a last byte of data in the DMA write transaction.

19. The method of claim 15, further comprising: providing synchronization control information to the bus until the peripheral controller is ready to output the data.

20. The method of claim 15, further comprising: transmitting an error message over the bus from the peripheral controller to the host.

21. A method of performing a direct memory access (DMA) read transaction from a memory to a peripheral controller via a host, the peripheral controller and the host being coupled to a bus having a plurality of general purpose signal lines, the method comprising:

requesting a DMA channel number from the host by serially transmitting a plurality of signals to designate the DMA channel number over a first control line which is separate from the bus;

granting the DMA read transaction to the peripheral controller by transmitting first control information over the bus;

transmitting data from the memory to the host; and writing the data over the bus to the peripheral controller.

22. The method of claim 21, further comprising: asserting an indication of a start of the DMA read transaction on a second control line.

23. The method of claim 21, further comprising:

transmitting second control information indicating a number of bytes in the DMA read transaction from the host to the peripheral controller over the bus.

24. The method of claim 21, further comprising:

transmitting an indication of a last byte of data in the DMA read transaction.

25. The method of claim 21, further comprising:

transmitting an error message over the bus from the peripheral controller to the host.

* * * * *